United States Patent

[11] 3,603,121

| [72] | Inventor | Charles W. Burkland<br>Newton, Iowa |
|------|----------|-------------------------------------|
| [21] | Appl. No. | 886,183 |
| [22] | Filed | Dec. 18, 1969 |
| [45] | Patented | Sept. 7, 1971 |
| [73] | Assignee | The Maytag Company<br>Newton, Iowa |

[54] APPLIANCE DRIVE SYSTEM
14 Claims, 9 Drawing Figs.

[52] U.S. Cl. .................................................. 68/23.4,
68/26, 68/208
[51] Int. Cl. .................................................. D06f 29/02
[50] Field of Search ........................................... 68/23.4,
23.7, 26, 208

[56] References Cited
UNITED STATES PATENTS
2,942,446  6/1960  Platt et al. .................... 68/208

3,525,241  8/1970  Morton ........................ 68/23.7
FOREIGN PATENTS
208,852  6/1957  Australia ...................... 68/208

*Primary Examiner*—William I. Price
*Attorneys*—William G. Landwier and Richard L. Ward ABSTRACT: A drive system for a fluid extraction portion of a laundry appliance includes a motor and a spinner each having a substantially fixed axis of rotation and a pump having an axis of rotation that is pivotable about a fixed axis spaced from the axis of rotation. A belt drivingly connects the motor to the spinner and the pump. The pivoted pump is biased about the pivot axis and effectively operates as an idler in the drive system engageable with the tight side of the belt for substantially no-slip drive of the pump while controlling tension of the belt driving the spinner.

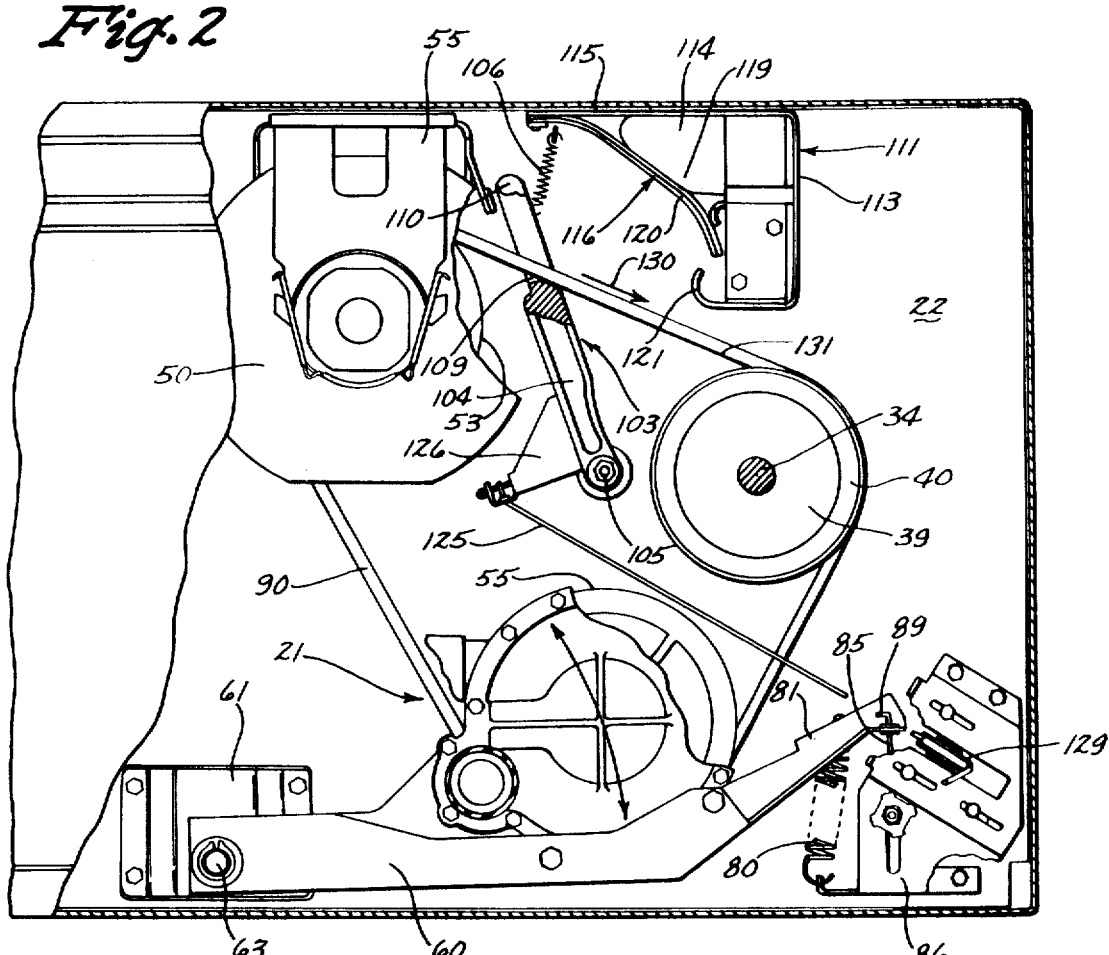

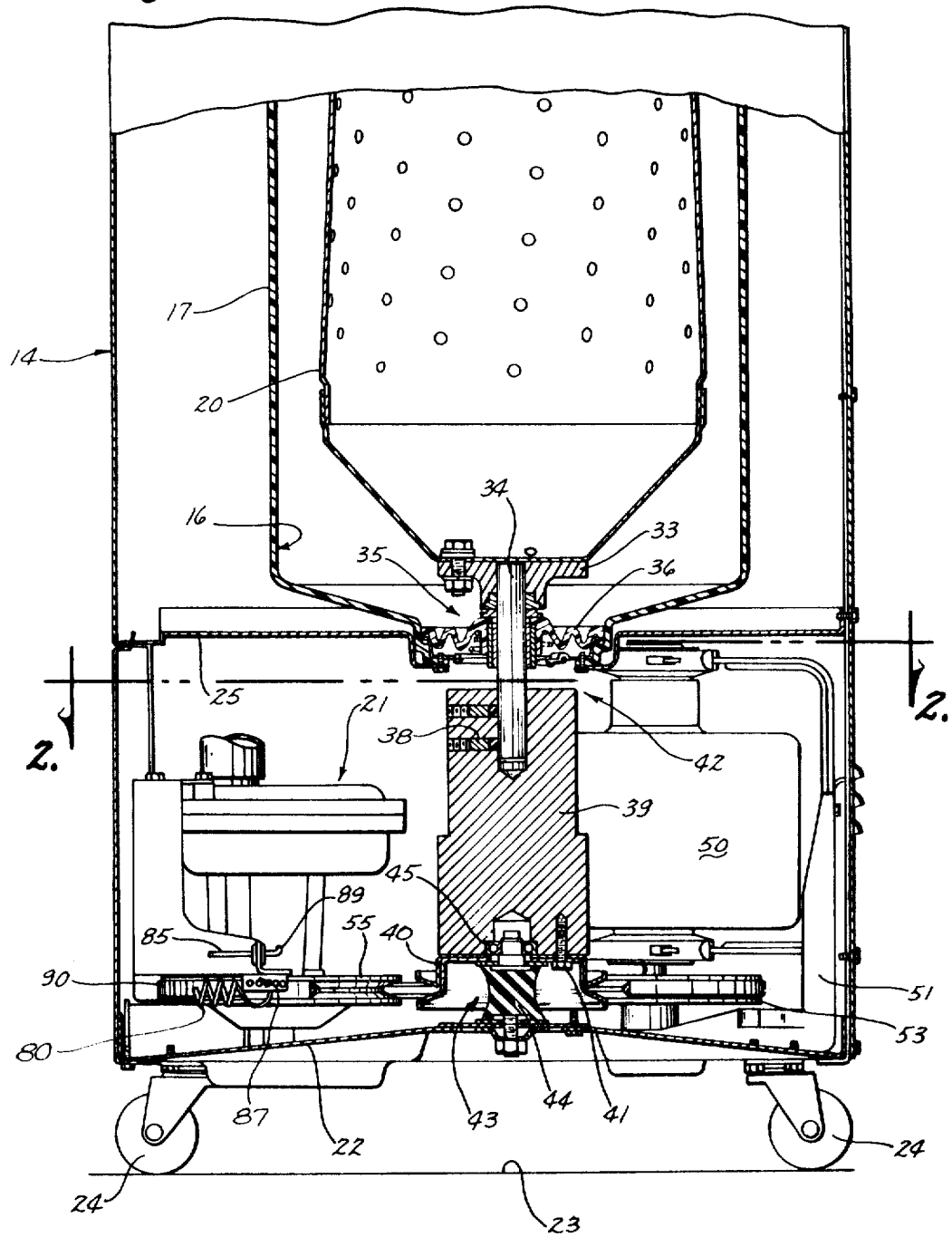

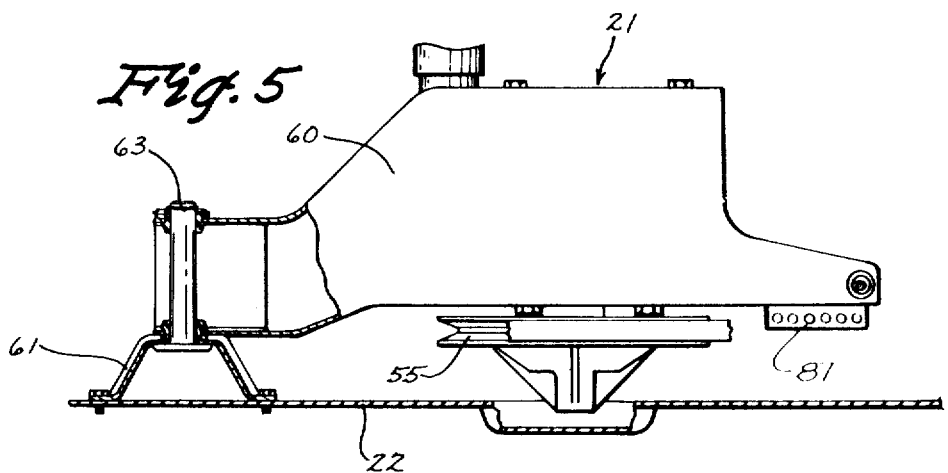
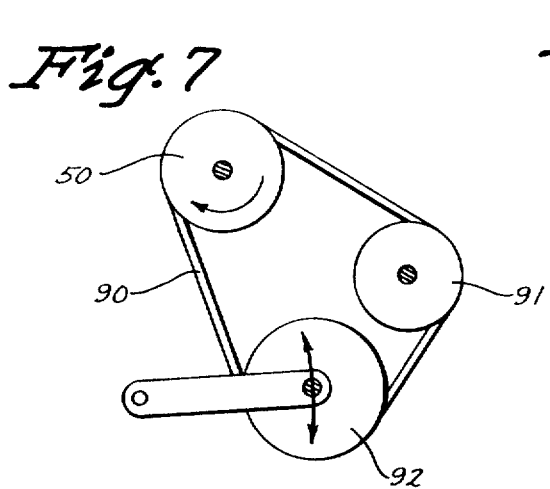
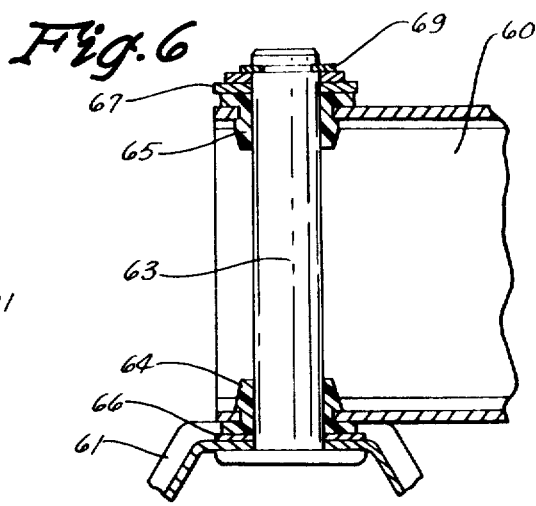
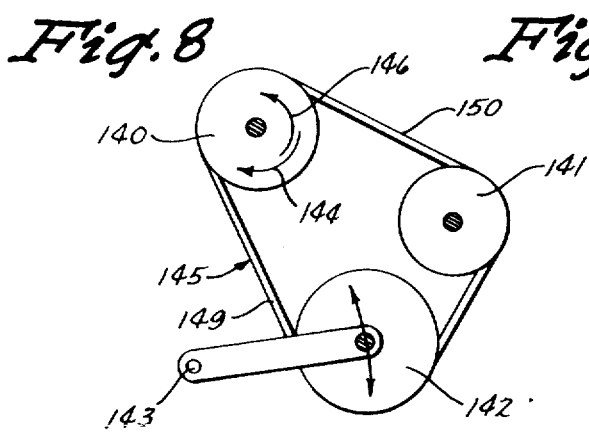
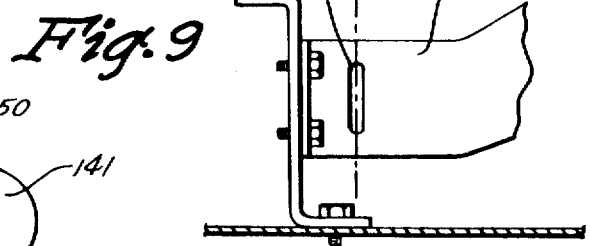

APPLIANCE DRIVE SYSTEM

BACKGROUND OF THE INVENTION

1. Field of the Invention

This invention relates to belt drive systems and more particularly to a belt drive system including a pulley rotatable on an axis of rotation for driving a member and pivotally movable about a pivot axis for controlling tension on the drive belt.

2 Description of the Prior Art

Belt drive systems are commonly used in electrical apparatus such as a laundry appliance. In driving a load such as a fluid extractor, however, it is necessary to provide clutch means in the drive system to achieve gradual acceleration of the extractor. A slipping belt, in combination with belt tension control means, has been shown as an expedient clutch means. In the prior art disclosures, the slipping belt arrangement has included a biased movable motor or a biased movable idler. Both of these arrangements, however, tend to complicate the drive system and add additional cost to the finished product.

SUMMARY OF THE INVENTION

It is an object of the instant invention to provide an improved belt drive system.

It is a further object of the instant invention to provide an improved belt tension control means in a belt drive system.

It is a further object of the instant invention to provide a belt drive system including a relatively fixed motor and a pivotally mounted pulley operable for driving a member and controlling tension in a drive belt.

It is a still further object of the instant invention to provide a drive system for a laundry appliance having a motor and a fluid extractor rotatable n relatively fixed axes of rotation and a pump rotatable on a pivotally movable axis.

These objects are achieved in a belt drive system including motor means, and first and second driven members in which the motor and one member are each rotatable about a relatively fixed axis of rotation and the other member is rotatable on an axis of rotation that is moveable about a pivot axis.

Operation of the device and further objects and advantages thereof will become evident as the description proceeds and from an examination of the accompanying three sheets of drawings.

DESCRIPTION OF THE DRAWINGS

The drawings illustrate a preferred embodiment of the invention with similar numerals referring to similar parts throughout the several views, wherein:

FIG. 1, located in a lower portion of the first sheet of drawings, shows a simplified perspective view of a laundry machine including a centrifugal extractor apparatus;

FIG. 2 is a view partially in section showing the drive system of the instant invention and taken generally along lines 2—2 of FIG. 4;

FIG. 3 is a fragmentary view showing an operative position of the brake system used in association with the instant invention;

FIG. 4 is a vertical sectional view of the centrifugal extractor portion of the laundry machine of FIG. 1;

FIG. 5 is a side elevation view of the pivotally mounting pumping means comprising a part of the drive system of the instant invention;

FIG. 6 is an enlarged fragmentary sectional view of a pivot mount arrangement for the pumping means;

FIG. 7 is a schematic diagram showing the belt drive system of a preferred embodiment of the instant invention;

FIG. 8 is a schematic diagram of an alternate embodiment of the belt drive system of the instant invention; and FIG. 9 is a fragmentary sectional view of an alternate pivotal mounting arrangement for the pumping means

DESCRIPTION OF THE PREFERRED EMBODIMENT

Referring to FIG. 1, there is shown a laundry machine 10 including washing and centrifugal extraction portions 11 and 12 enclosed within a cabinet structure 14. The washing and centrifugal extraction portions 11 and 12 include the containers 15 and 16 defined by tub 17 and individually accessible through a pair of panels or lids 18 and 19. The instant invention is primarily directed to the drive system for the laundry machine 10 and more specifically to the drive for the perforated fabric container 20 and the pumping means 21 shown in FIG. 2 and as will be more fully described hereinafter.

Referring to the plan view of FIG. 2 and to the vertical section of FIG. 4 the structure of the centrifugal extraction portion 12 and the drive system for the rotatable fabric container 20 will be described. The cabinet structure 14 is mounted on a base member 22 that is in turn supported on a horizontal surface 23 by a plurality of casters 24. The tub 17 within the cabinet structure 14 defines the fluid container 16 in which is disposed a rotatable fabric container 20. A substantially horizontal divider or bulkhead 25 is positioned below the tub 17 and defines a lower chamber of the drive system of the laundry machine 10.

The fabric container 20 is fixed to a hub 33 and in turn to a shaft 34 having a press fit in hub 33 and is rotatable within the fluid container 16. A seal assembly 35 is positioned at the bottom of the fluid container 16 substantially coaxially which the shaft 34 and is operable for closing the bottom of the fluid container 16 and providing a dynamic seal connection with the rotatable hub 33. The seal assembly 35 includes a convoluted portion 36 permitting nutational movement of the fabric container 20 relative to the fluid container 16 during centrifugal operation of the fabric container 20.

The mounting of the fabric container 20 further includes a weighted coupling member 39 attached to shaft 34 by a pair of set screws 38 and providing a coupling of the shaft 34 to a driven pulley 40. The driven pulley 40 is attached to the weighted coupling member 39 by a plurality of threaded members 41. The assembly rotatable as a unit and including the container 20, hub 33, shaft 34, coupling 39, and driven pulley 40 may be termed the spinner assembly and designated generally by the numeral 42. The spinner assembly 42 is rotatably and nutationally supported on the base 22 by a resilient mounting assembly 43 fixed to the base number 22. The resilient mounting assembly 43 includes a resilient flexible portion 44 permitting the nutational movement of the spinner assembly 42 relative to the base 22. A bearing 45 is provided between the resilient mounting assembly 43 and the spinner assembly 42. The spinner assembly 42 is mounted for rotation on a substantially vertical axis and is nutatably movable from the vertical axis responsive to unbalance loading conditions within the container 20. The mounting assembly 43 is adjustable relative to the base 22 to provide for centering of the spinner assembly 42. The pulley 40 is axially juxtaposed the pivot point of nutationally mounted spinner assembly 42 for minimizing changes in belt tension as the spinner assembly nutates.

Further details of construction and mounting of the centrifugal extractor is shown in a copending application entitled Centrifugal extractor Mounting filed by Edward O. McCartney on the date of filing of the instant invention and assigned to the assignee of the instant invention.

A preferred embodiment of the drive system for the centrifugal extractor is best shown in FIG. 2 and includes an electrically energizable motor 50 mounted on the base 22 through mounting bracketry 51. A resilient mounting ring is disposed between the mounting bracketry 51 and the motor 50 at each end thereof but is otherwise mounted in a fixed relationship relative to the base 22. A drive pulley 53 is disposed at the lower end of the motor 50 and is positioned in substantially the same horizontal plane as the driven pulley 40 of the spinner assembly 42.

The laundry machine 10 further comprises fluid pumping means indicated generally by the numeral 21 and operable for controlling fluid flow in the fluid system of the laundry machine 10. The pumping means 21 includes a pulley 55 substantially aligned in the horizontal plane of the driving pulley 53 and the driven pulley 40. The pump pulley 55 is driven by the motor 50 for operating the pump, but in addition the pumping means 21 is pivotally mounted on the base frame 22 so that the pump pulley 55 is operable as an idler in the drive system of the extractor.

As best shown in FIGS. 2 and 5, the pumping means 21 is secured to an elongated generally channel-shaped pump supporting bracket 60 that is in turn pivotally supported on the base 22 at one end through the bracket 61 fixed to the base 22. The pivot mounting is more specifically shown in FIG. 6 and includes a pivot pin 63 extending upwardly form the base-mounted bracket 61, a par of opposed pivot bearings 64 and 65, a pair of oppositely disposed washers 66 and 67, and a retaining ring 69. An alternate pivot construction is shown in FIG. 9 and includes a supporting bracket 73 on which the pump is mounted and which in turn is attached to a base-mounted bracket 74. The bracket 73 includes an elongated recess 75 reducing the effective cross section of the bracket at that point and thereby providing a flexing pivot for the pump generally along line 76. As viewed in FIG. 2, the pump supporting bracket 60 is biased in a clockwise direction about the pivot pin by a spring 80 connected between the outwardly extending arm 81 of the pump supporting bracket 60 and a bracket 86 securely fixed to the base frame 22. The spring 80 may be connected to the arm 81 at one of the plurality of holes 87 to achieve the desired idler tension on belt 90.

The pump means 21 is connected to conduits communicating with the fluid containers 15 and 16 and with an external drain. Since the pump means 21 and spinner assembly 42 are both driven by the motor 50, the pump 21 is operable for pumping fluid out of one of the fluid containers 15 or 16 whenever the spinner assembly 42 is rotated. A selectively operable two-position diverter valve (not shown) controls flow from the fluid containers 15 and 16 to the pump inlet.

Each of the conduits connected to the pump are sufficiently flexible to permit a limited amount of relatively free movement of the pump 21 about the pivot 63. A stop member 85 is adjustably connected to to the base-mounted bracket 86 and includes a finger 89 engageable with the pump supporting bracket 60 for positively limiting counterclockwise movement of the pumping means 21 during a belt braking operation as will be described hereinafter.

A vee belt 90 drivingly connects the driving pulley 53 to the spinner pulley 40 and the pump pulley 55. Referring to FIG. 7, the belt 90 effects a common driving connection between the motor 50 and the two driven loads or members schematically shown as numerals 91 and 92 and representing the spinner assembly 42 and pumping means 21, respectively, as applied to the preferred embodiment.

When the motor 50 drives in a clockwise direction, as in FIG. 7, the second member 92 is disposed on the tight side of the belt 90 whereas the first member 91 is disposed on the loose side of the belt relative to the driving motor 50. Thus upon operation of the motor 50, the second member 92 will be driven by the belt 90 in a clockwise direction with relatively little slippage by virtue of its biased tight side engagement so as to achieve substantially full torque transmission. It is also clear that the loose side connection of the motor 50 to the first member 91 will permit slippage relative to the belt 90 to achieve a slow acceleration especially when there is a heavy load or resistance to acceleration. Such a resistance may occur when the fabric container 20 is attempting to spin with a load of fabrics within a container of fluid.

Referring to FIGS. 2 and 3, there is shown a belt brake mechanism, indicated generally by numeral 103, associated with the drive belt 90 and operable for effecting a braking of the spinner assembly 42. The brake mechanism includes a movable brake arm member 104 operable to a braking position for applying relatively heavy frictional drag to the belt 90 for effectively reducing the speed of rotation of the spinner assembly 42. The brake arm member 104 is pivotally mounted on the base 22 and is biased about a pivot 105 toward the belt for relatively light engagement therewith by the biasing forece of a spring member 106 connected between the brake arm member 104 and the base 22.

The brake arm member 104 is formed with a vee slot at 109 corresponding substantially to the shape of the vee belt 90 for frictional engagement with the sides of the vee belt. The biasing force of the spring 106 is operable toward maintaining the vee slot of the brake arm 104 in lightly loaded contract with the belt 90 for only low frictional drag on the vee belt when the vee belt is in a loose or slack side condition. In this position, however the brake arm member 104 will respond to change from the loose side to the tight side condition of the belt 90 for actuating to a braking positioned as will be more fully described hereinafter.

The pivotally mounted brake arm member 104 also includes an outwardly disposed finger portion 110 engageable with a stop assembly 111 upon movement of the brake arm 104 to the operative braking position as shown in FIG. 3. The stop assembly 111 includes bracketry 113 fixed to the base 22 for confining a resilient cushion of polyurethane foam 114 and providing a supporting flange 115 for a flexible and resilient pad 116 that is engageable by the finger portion 110 of the brake arm member 104. The flexible pad 116 is laminated and includes a solid but flexible polyurethane layer 119 and a polypropylene felt layer 120 engageable by the brake arm member finger portion 110.

The bracketry 113 also defines a projecting portion 121 engageable by the backside of the vee belt 90 upon movement of the brake arm 104 to its braking position as shown in FIG. 3. Engagement of the belt 90 with the projecting portion 121 tends to produce a reverse bend in the belt 90 and to foreece the belt further into the vee groove for increasing the braking drag on the belt.

Also in FIG. 2 and 3, there is shown a cable 125 attached to the brake arm 104 through a bracket 126 fixed to the brake arm. The cable 125 extends along the base 22 to a cable pulley 129 mounted on the base-mounted bracket 86 and then extends upwardly from the cable pulley 129. In a preferred embodiment, the cable 125 is responsive to a condition of the lid 19 for effecting operation of the brake. For example, a closing of the lid !19 or the operation of a lid latch (not shown) may be used to apply tension to the cable 125 for overcoming the low force of biasing spring 106 and moving the brake arm 104 out of the belt engaging position to prevent operation of the brake. On the other hand, an opening movement of the lid 19 or an unlatching of a lid latch deenergizes the motor and relieves the tension on the cable 125 to permit movement of the brake arm 104 into engagement with the belt 90 for effectively actuating the brake arm to the position shown in FIG. 3 and reducing the speed of fabric container 20. More specifically, upon releasing the tension on the cable 125, the brake arm 104 is moved by spring 106 to a belt engaging position. With the loose side of the belt 90 becoming the tight side as the spinner assembly 42 overdrives the deenergized motor 50 and with the belt 90 moving as indicated by the arrow 130 in FIG. 3, the brake arm member 104 is moved to the belt braking position as shown in FIG. 3 to apply a relatively large frictional drag on the belt 90 and effects a reduction in speed of the spinner assembly 42.

Further details of construction and operation of the belt brake mechanism and brake control mechanism are shown in the copending application entitled Spinner Control for a Laundry Apparatus filed by Thomas R. Smith on the date of filing of the instant application and assigned to the assignee of the instant invention.

By way of further explanation of the instant invention, the operation of the centrifugal extractor and the operation of the drive system will now be summarized. Upon the proper closing of the lid 19 or the latching of the lid and initiation of the extraction cycle by the operator, the motor 50 will be energized for accelerating and driving the spinner assembly 42 through the vee belt 90 engageable with the driven pulley 40 and with the movably mounted pump pulley 55. With the motor 50 operating in a clockwise direction and the belt moving as indicated by the arrow 130 in FIGS. 2 and 3, first leg 131 of the belt 90 extending between the motor pulley 53 and the driven pulley 40 assumes a loose or slack side condition whereas the other leg of the belt 90 extending between the motor 50 and the driven pulley 40 assumes a tight side condition.

The motor 50 will begin to accelerate the spinner assembly 42 but because of the resistance to acceleration of the spinner assembly 42, there will tend to be slippage between the driven pulley 40 and the belt 90. The pump 21, however, will tend to operate with relatively no belt slippage at pulley 55 because of the biased engagement of the pump pulley 55 with the tight side belt and the pump will assume substantially full operating speed even though there is some slippage between the belt and the driven pulley 40. This general condition will continue until the spinner assembly 42 has reached the normal operating speed.

The spinner assembly 42 in the instant embodiment is soon accelerated toward and reaches an approximate operating speed of 2000 r.p.m. During this normal motor driven operation, the movable brake arm member 104 is maintained in a position disengaged from the belt 90 by the tensioned cable 125. If during this operation the lid latch is unlatched or the lid 19 is opened so that the cable tension is removed, the brake arm 104 is released for biased movement to a second position lightly engaged with the belt 90 Upon deenergization of the motor 50, responsive also to the lid or latch therefor, the motor rotor and the motor pulley 53 immediately start to decelerate. The spinner assembly 42, however, includes a relatively large rotating mass and decreases in speed more slowly so as to overdrive the motor 50 and effectively become the driver. With the spinner assembly 42 effectively driving the motor 50, the belt leg between the motor pulley 53 and the driven pulley 40 assumes a tight side condition. The belt 90 immediately picks up the brake arm 104 through a rather substantial increase in drag between the belt and the vee groove of the brake arm 104 and causes the brake arm member to move from the position shown generally in FIG. 2 toward the position shown in FIG. 3. Once movement of the brake arm member 104 is initiated, the drag between the belt and the brake arm builds up rapidly and the movable brake member is moved quickly to the braking position.

The pump assembly 21 is movable only as far as the finger 89 permits so that movement of the brake arm 104 from the position of light engagement toward the braking position substantially increases the amount of tension on the belt and thereby substantially increases the frictional drag between the brake arm 104 and belt 90.

Upon the completion of the braking operation, at which time the spinner assembly 42 reaches a substantially stopped condition, the stop assembly 111 including the resilient pad 116 and cushion 114 function to provide a biasing force assisting the biasing spring 106 for initiating return of the brake arm 104 from the position shown in FIG. 3 to the position shown generally in FIG. 2.

Referring to FIG. 8, there is shown an alternate embodiment of the instant invention including a bidirectionally operable drive motor 140. The axis of the motor 104 and the axis of a first driven load or member 141 are generally fixed and substantially parallel to each other. The first member 141 might be transmission of an automatic washing machine operable for driving the spinner in one direction and operating an agitator in the other direction. The axis of a second load or member 142, such as a pump, is substantially parallel to the axes of the motor 140 and first member 141 and is movable about the pivot 143.

Upon rotation of the motor in the clockwise direction, as indicated by arrow 144 in FIG. 8, the pivoted second member 142 is on the tight side 149 of the belt 145 and the system operates substantially as previously explained to achieve a degree of slippage at the first driven member 141, for accelerating a spinner, and substantially no slippage at the second member 142.

Upon rotation of the motor 140 in the counterclockwise direction, as indicated by arrow 146 in FIG,. 8, the opposite belt leg 150 becomes the tight side and the pivoted second member 142 is operable as a loose side idler to effect substantially no-slip drive of the first and second members.

It is therefore seen that the instant invention comprising a pivotally mounted pump is operable for achieving unique advantages in an apparatus such as a laundry appliance. First, the use of a driven pulley as an idler eliminates the need for a separately provided idler or for the complicated structure involved in movably mounting the motor. Furthermore, this arrangement achieves, in a preferred embodiment, a system in which the pump is operable at substantially full speed to effect efficient removal of water from one of the fluid containers while the spinner may slip to achieve a relatively slow acceleration. The rapid efficient pumping, in fact, assists in removing the obstacle to acceleration of the container when the pump is removing fluids from the extractor fluid container.

In the drawings and specification, there has been set forth a preferred embodiment of the invention and, although specific terms are employed, these are used in a generic and descriptive sense only and not for purposes of limitation. Charges in form and the proportion of parts as well as the substitution of equivalents are contemplated as circumstances may suggest or render expedient without departing from the spirit or scope of this invention.

I claim:

1. In a laundry machine, the combination comprising: a support structure; fabric container means rotatably mounted on said support structure; a first driven pulley rotatably supported on a first axis of rotation and operable for driving said container means, pump means in fluid communication with said container means; a second driven pulley rotatably mounted relative to said support structure and operable on a second axis of rotation for driving said pump means; means for mounting said second driven pulley on said support structure for pivotal movement about a pivot axis spaced from said second axis of rotation; drive means including a drive pulley rotatable on a third axis of rotation spaced from said first and second axes of rotation; a belt means drivingly connecting said drive pulley to said first and second driven pulleys; and means for biasing said pivotally mounted second driven pulley into engagement with said belt means whereby said pivotally mounted second driven pulley functions as an idler means.

2. In a laundry machine as defined in claim 1 wherein the first axis of rotation of said first driven pulley and the third axis of rotation of said drive pulley are each generally fixed relative to said support structure and are generally parallel relative to each other.

3. In a laundry machine as defined in claim 1 wherein said second axis of rotation is generally parallel to said first axis of rotation and to said third axis of rotation and is movable about said pivot axis for controlling the driving tension on said belt means between said drive pulley and said first driven pulley.

4. In a laundry machine as defined in claim 1 wherein said drive means includes a motor substantially fixed to said support structure through vibration damping means and wherein said drive pulley is mounted on and driven by said motor.

5. In a laundry machine, the combination comprising: a support structure; fabric container means rotatably mounted on said support structure; a first driven pulley rotatably supported on a first axis of rotation and operable for driving said container means; pump means in fluid communication with said container means; a second driven pulley rotatably mounted relative to said support structure and operable on a second axis of rotation for driving said pump means; means for mounting said second driven pulley and said pump means on said support structure for pivotal movement about a pivot axis spaced from said second axis of rotation; drive means including a drive pulley rotatable on a third axis of rotation spaced from said first and second axes of rotation; a belt means drivingly connecting said drive pulley to said first and second driven pulley; and means for biasing said pivotally mounted second driven pulley into biased engagement with said belt means whereby said pivotally mounted second driven pulley functions as an idler means having a substantially no-slip engagement with said belt means and being operable for controlling the driving tension on said belt means between said drive pulley and said first driven pulley as well as driving said pump means.

6. In a laundry machine, the combination comprising: a support structure; fabric container means rotatably mounted on said support structure; power transmission means operable in a first direction for rotating said container means; a first driven pulley rotatably supported on a first axis of rotation and operable for driving said transmission means; pump means in fluid communication with said container means; a second driven pulley rotatably mounted relative to said support structure and operable on a second axis of rotation for driving said pump means; means for mounting said second driven pulley and said pump means on said support structure for pivotal movement about a pivot axis spaced from said second axis of rotation; drive means including a bidirectional motor mounted on said support structure; a motor pulley mounted on and driven by said motor in first and second directions; a belt means drivingly connecting said motor pulley to said first and second driven pulleys, said second driven pulley being located for engagement with the tight side of said belt means with said motor operating in said first direction; and means for biasing said pivotally mounted second driven pulley into engagement with said belt means to drive said pump means and control the driving tension on said belts means between said motor pulley and said first driven pulley, said pivotally mounted second driven pulley being operable upon rotation of said motor in said first direction for effecting controlled slippage of said belt means at said first driven pulley while maintaining substantially no-slip engagement of said second driven pulley with said belt means whereby said pump means receives substantially full power input while said power transmission means receives less than full power input for gradually accelerating said container means in said first direction of rotation of said motor, said second driven pulley being operable upon rotation of said motor in said second direction for effecting substantially no-slip drive of said first and second driven pulleys whereby said pump means and said power transmission means receive substantially full power input in said second direction of rotation of said motor.

7. In a laundry machine as defined in claim 6 wherein the axis of rotation of said first driven pulley and the axis of rotation of said motor pulley are generally fixed relative to said support structure and parallel to each other and wherein the axis of rotation of said second driven pulley remains generally parallel to the axis of rotation of said first driven pulley and said motor pulley in movement about said pivot axis for controlling the tension on said belt means.

8. In an extractor apparatus, the combination comprising: a support structure; a container for receiving material and rotatably mounted on said support structure; a driven pulley for rotating said container to centrifugally remove liquid from the material in said container; pump means communicating with said container and operable for pumping liquid removed from said material; a pump pulley mounted on said pump means and operable for driving said pump means; drive means including a motor mounted on said support structure; a motor pulley mounted on and driven by said motor; a belt means drivingly connecting said motor pulley to said driven pulley and said pump pulley; means for pivotally mounting said pump means on said support structure for engagement of said pump pulley with said belt means; and means for biasing said pivotally mounted pump means for effecting engagement of said pump pulley with said belt means whereby the pump pulley of said pivotally mounted pump means functions as an idler means drivingly engageable with said belt means and operable for controlling the driving tension on said belt means between said motor pulley and said driven pulley.

9. In an extractor apparatus as defined in claim 8 wherein the axis of rotation of said driven pulley and the axis of rotation of said motor pulley are substantially fixed relative to said support structure and parallel to each other and wherein said pump means is pivotally operable about a pivot axis parallel to the axes of rotation of said driven pulley and said motor pulley.

10. In a laundry machine, the combination comprising: a support structure; spinner means for receiving fabrics and mounted on said support structure for centrifugal rotation to remove liquid from the fabrics; pumping means on said support structure pivotally movable about a pivot axis and rotatably operable for pumping liquid removed from said fabrics; motor means mounted on said support structure; means including a belt means drivingly connecting said motor means to said spinner means and said pumping means to effect rotative operation thereof; and means for biasing said pumping means about said pivot axis for operation as an idler to control the driving tension on said belt means between said motor means and said spinner means.

11. In a laundry machine as defined in claim 10 wherein said pumping means is disposed juxtaposed the tight side of said belt means and said spinner means in disposed juxtaposed the loose side of said belt means with rotation of said motor means in a first direction whereby said pumping means is operable at substantially full speed while said spinner means is operable at less than full speed through slippage of said belt means at said spinner means.

12. In a laundry machine as defined in claim 10 wherein the axes of rotation of said spinner means and said motor means are substantially fixed relative to said support structure and are parallel to each other and wherein the pivot axis of said pumping means is parallel to the axes of rotation of said spinner means and said motor means.

13. In a laundry machine as defined in claim 10 and further comprising bracket means fixed to said pumping means and to said support structure and including an intermediate portion permitting substantially pivotal movement of said pumping means relative to said support structure.

14. In a laundry machine as defined in claim 13 wherein said bracket means is in the form of a unitary member and wherein said intermediate portion includes a recess reducing the effective cross section of said bracket means at said recess for defining a flexing pivot for said pumping means.